(12) United States Patent
Wakabayashi et al.

(10) Patent No.: US 9,401,233 B2
(45) Date of Patent: Jul. 26, 2016

(54) WATER BLOCKING STRUCTURE FOR INSULATION-COATED WIRE AND WIRE HARNESS

(71) Applicant: SUMITOMO WIRING SYSTEMS, LTD., Mie (JP)

(72) Inventors: Masataka Wakabayashi, Mie (JP); Hiroyuki Ootsuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/736,809

(22) Filed: Jun. 11, 2015

(65) Prior Publication Data

US 2015/0371732 A1 Dec. 24, 2015

(30) Foreign Application Priority Data

Jun. 20, 2014 (JP) ................................ 2014-127133

(51) Int. Cl.
*H02G 15/02* (2006.01)
*H01B 7/282* (2006.01)
*H01B 7/00* (2006.01)

(52) U.S. Cl.
CPC .............. *H01B 7/282* (2013.01); *H01B 7/0045* (2013.01)

(58) Field of Classification Search
USPC ...... 174/74 R, 77 R, 78, 79, 84 R, 88 R, 94 R
See application file for complete search history.

(56) References Cited

U.S. PATENT DOCUMENTS

| 3,507,977 | A | * | 4/1970 | Pusey | H01R 4/00 174/110 PM |
| 3,539,708 | A | * | 11/1970 | Alleva | H01R 4/2495 174/84 C |
| 3,839,595 | A | * | 10/1974 | Yonkers | H01R 4/2495 174/84 C |
| 4,065,637 | A | * | 12/1977 | Allison | H01R 4/2495 174/84 C |
| 4,118,596 | A | * | 10/1978 | Bassett | H01R 43/00 174/84 C |
| 4,896,904 | A | * | 1/1990 | Gadsden | B29C 61/0616 156/86 |
| 5,431,758 | A | * | 7/1995 | Delalle | H02G 15/043 156/49 |
| 5,470,622 | A | * | 11/1995 | Rinde | B29C 61/0616 156/84 |
| 5,514,836 | A | * | 5/1996 | Delalle | H01R 4/22 174/74 R |
| 5,821,460 | A | * | 10/1998 | Marmy | H01R 4/22 174/74 A |
| 6,107,573 | A | * | 8/2000 | Uchiyama | H01R 4/22 174/75 R |
| 6,359,226 | B1 | * | 3/2002 | Biddell | H01R 4/22 174/74 A |
| 7,834,268 | B2 | * | 11/2010 | Ootsuki | H01R 4/22 174/74 A |

FOREIGN PATENT DOCUMENTS

| JP | 2000-113917 | 4/2000 |
| JP | 2001-057252 | 2/2001 |
| JP | 2008-131327 | 6/2008 |

* cited by examiner

*Primary Examiner* — William H Mayo, III
(74) *Attorney, Agent, or Firm* — Greenblum & Bernstein, P.L.C.

(57) ABSTRACT

A water blocking structure for an insulation-coated wire includes a heat-shrinkable tubular protective member that is closed at one end and that accommodates an intermediate portion of an insulation-coated wire that is bent in a folded-backward direction, and a resin material that is accommodated in the protective member and that penetrates the intermediate portion of the insulation-coated wire. A slit portion is formed by a cutting instrument in a coating of the insulation-coated wire within a region where the intermediate portion is bent in the folded-backward direction, and a water blocking agent penetrates the intermediate portion via this slit portion.

10 Claims, 7 Drawing Sheets

WATER BLOCKING STRUCTURE FOR INSULATION-COATED WIRE AND WIRE HARNESS

TECHNICAL FIELD

The present invention relates to a water blocking structure for an insulation-coated wire and a wire harness, and particularly relates to a water blocking structure for an insulation-coated wire that is effective when provided at an intermediate portion of the insulation-coated wire and a wire harness.

BACKGROUND ART

In wire harnesses that are installed in automobiles and the like, often, a coating of an insulation-coated wire is partially stripped to expose a conductor composed of a group of elemental wires, and another wire is connected to the exposed portion of the conductor by welding or by using a crimp terminal, or a connection terminal is crimped onto the exposed portion of the conductor. In cases where such an exposed portion of a conductor or an electrical connection portion is disposed in an area that may be exposed to water, reliable waterproofing is required.

Therefore, conventionally, a branch connection structure has been proposed in which a terminal splice portion for branching a branch line from a trunk line of a wire harness serving as a communication line for an on-board network is contained in a protective cap made of resin, and this protective cap is fixed to a portion near end portions of respective coatings of the trunk line and the branch line by winding tape therearound or by using a heat-shrinkable tube or a water blocking agent (see JP 2008-131327A, for example).

Also, a waterproofing device has been proposed in which a core wire (conductor) exposed portion that is uncoated is formed at an intermediate portion of a plurality of coated lead wires that are bent upward in an inverted U shape, and a waterproof and heat-resistant insulating tube that is bent in an inverted U shape is provided, the insulating tube covering the core wire exposed portion of the plurality of coated lead wires (see JP 2000-113917A, for example).

JP 2008-131327A and JP 2000-113917A are examples of related art.

However, the former conventional water blocking structure for an insulation-coated wire, in which the terminal splice portion is contained in the protective cap, cannot be used for waterproofing of an intermediate splice portion.

On the other hand, even though the latter conventional water blocking structure for an insulation-coated wire, in which a plurality of coated lead wires having the core wire exposed portion are folded in an inverted U shape, can be used for blocking water at the conductor exposed portion in the intermediate portion or waterproofing of the intermediate splice portion, there are unsolved problems as described below.

That is to say, in the latter conventional water blocking structure for an insulation-coated wire, the insulation-coated wire with the conductor exposed portion formed in the intermediated portion thereof is inserted into the insulating protective tube, and that insulation-coated wire is bent in an inverted U shape together with the insulating protective tube at a position different from the conductor exposed portion that is easy to bend. Therefore, the operation of bending that insulation-coated wire and the insulating protective tube is not easy and thus increases the manufacturing cost. In addition, the insulating protective tube after bending tends to be corrugated or bent in the vicinity of the conductor exposed portion, and an end portion of the coating of the insulation-coated wire that is adjacent to the conductor exposed portion tends to be opened. Therefore, the water blocking ability may be easily deteriorated.

Furthermore, for both the conventional water blocking structures for an insulation-coated wire, a coating stripping operation of stripping off the coating at a predetermined position and in a section of a predetermined length in advance is indispensable. Therefore, in a case where, for example, a high level of water blocking performance is desired by preventing especially the intermediate portion of the insulation-coated wire from suffering secondary exposure to water from the terminal portion, the problems such as deterioration in workability and an increase in manufacturing cost cannot be avoided.

SUMMARY OF THE INVENTION

The present invention was made in order to address problems such as those described above, and it is an object thereof to provide a low-cost water blocking structure for an insulation-coated wire that can ensure high water blocking ability and favorable workability at an intermediate portion of the insulation-coated wire and also provide a low-cost wire harness having high water blocking ability and favorable workability.

In order to accomplish the above-described object, a water blocking structure for an insulation-coated wire according to the present invention is a water blocking structure for an insulation-coated wire, the water blocking structure including a heat-shrinkable tubular member that is closed at one end and that accommodates an intermediate portion of an insulation-coated wire that is bent in a folded-backward direction, and a water blocking agent that is accommodated in the tubular member and that penetrates the intermediate portion of the insulation-coated wire, wherein a slit portion is formed by a cutting instrument in a coating of the insulation-coated wire within a region where the intermediate portion is bent in the folded-backward direction, and the water blocking agent penetrates the intermediate portion via the slit portion.

With this configuration, the present invention eliminates the necessity to perform a coating stripping operation for exposing a conductor within a certain longitudinal region of the intermediate portion of the insulation-coated wire in a longitudinal direction in advance, and thus a low-cost water blocking structure for an insulation-coated wire that can ensure high water blocking ability and favorable workability is obtained.

In the water blocking structure for an insulation-coated wire according to the present invention, it is preferable that a coating stripping member having a blade portion that is capable of cutting open the coating of the insulation-coated wire is contained inside the tubular member in a state in which the blade portion is cutting into the coating.

With this configuration, before heat shrinkage of the tubular member, when cutting by the blade portion is performed in a state in which a stress due to bending in the folded-backward direction acts on the coating within the bent region, the coating is reliably cut open at a predetermined position due to a combined effect of the cutting and the stress, and the blade portion prevents the coating in the cut-open state from being closed. As a result, the heat-shrinkable tubular member is thermally shrunken in a state in which the water blocking agent has reliably penetrated the coating and even, for example, gaps among elemental wires of the conductor from the slit portion of the insulation-coated wire, and thus a water blocking structure for an insulation-coated wire that can ensure high water blocking ability and favorable workability can be realized.

In the water blocking structure for an insulation-coated wire according to the present invention, it is preferable that the blade portion has a greater thermal conductivity than both the water blocking agent and the coating.

With this configuration, during the application of heat for thermally shrinking the tubular member, the blade portion can cut into the coating with an increased efficiency.

In the water blocking structure for an insulation-coated wire according to the present invention, it is also possible that a closing member that closes one end of the tubular member and a holding member that is joined to the closing member and holds the intermediate portion of the insulation-coated wire together with the closing member are provided, the coating stripping member is constituted by at least one of the closing member and the holding member, and the water blocking agent is formed of a cured layer of a two-component thermosetting epoxy resin.

With this configuration, while one end portion of the tubular member is caused to shrink so as to come into close contact with the closing member and is thus closed, an inner diameter of the tubular member that is suitable for an operation of inserting a wire into the tubular member can be easily set. Accordingly, before thermal curing of a thermosetting epoxy resin, which is the water blocking agent, it is possible to introduce the water blocking agent into the tubular member together with a portion of the insulation-coated wire and bring the water blocking agent into close contact with the circumference of the conductor. Moreover, it is possible to use a low-viscosity, two-component thermosetting epoxy resin that exhibits a high degree of adhesion to the conductor and that also easily penetrates gaps and the like among the conductor elemental wires within the coating. Accordingly, a stable cured layer of a water blocking agent resin in which the resin is cured after reliably penetrating the gaps among the elemental wires and the like of the conductor while being in close contact with the circumference of the conductor within the coating and that has high water blocking ability and high resistance to heat can be formed.

A wire harness according to the present invention includes the water blocking structure for an insulation-coated wire that is configured as described above. With this configuration, a low-cost wire harness having high water blocking ability and favorable workability is obtained.

According to the present invention, it is possible to provide a low-cost water blocking structure for an insulation-coated wire that can ensure high water blocking ability and favorable workability at an intermediate portion and also provide a low-cost wire harness having high water blocking ability and favorable workability.

BRIEF DESCRIPTION OF THE DRAWINGS

FIGS. 2A and 2B show a coating stripping member of the water blocking structure for an insulation-coated wire according to the first embodiment of the present invention in a state in which the coating stripping member is opened to the side of a closing member and the side of a holding member.

EMBODIMENTS OF THE INVENTION

Hereinafter, embodiments for carrying out the present invention will be described.

First Embodiment

FIGS. 1 to 5 show a first embodiment of a wire harness including a water blocking structure for an insulation-coated wire according to the present invention. In the present embodiment, the present invention is applied to a wire harness for a vehicle, the wire harness having a water blocking structure at an intermediate portion of a single insulation-coated wire. Naturally, the present invention is also applicable to a case where a water blocking structure is provided at an intermediate portion of a plurality of insulation-coated wires.

The configuration of the present embodiment will be described first.

Figure 1:
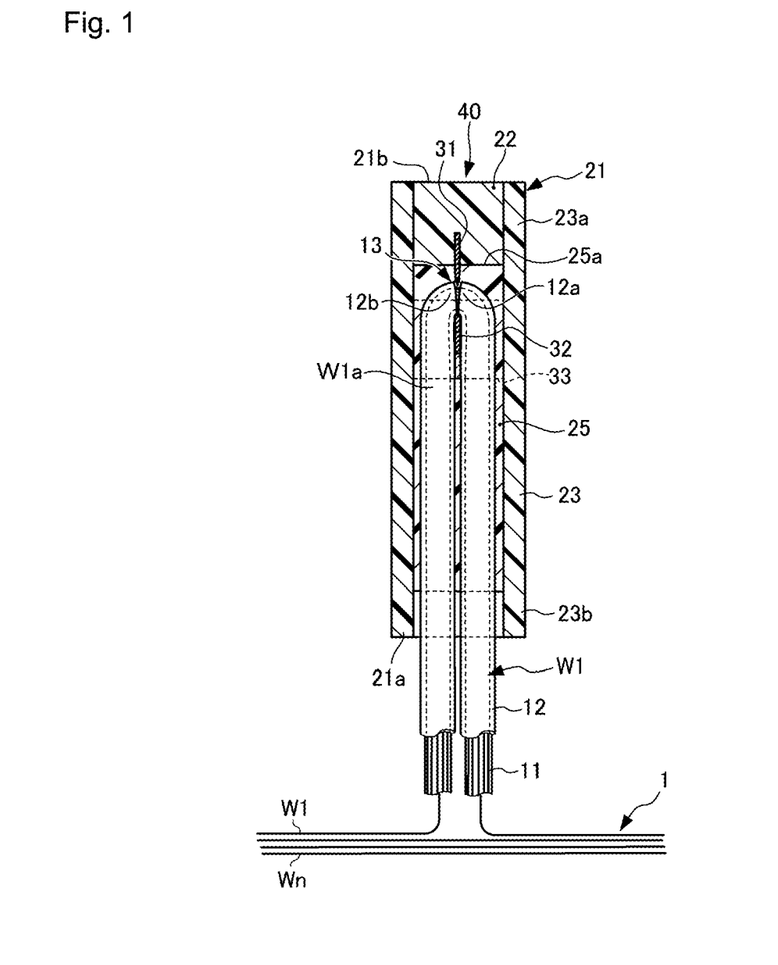
FIG. 1 is a cross-sectional view of a relevant portion of a wire harness including a water blocking structure for an insulation-coated wire according to a first embodiment of the present invention.

As shown in FIG. 1, the water blocking structure for an insulation-coated wire according to the present embodiment is provided on an insulation-coated wire W1 of a wire harness 1 having a plurality of insulation-coated wires W1 to Wn (n is a natural number of 2 or more) serving as a group of wires in a bundle.

Figure 5:
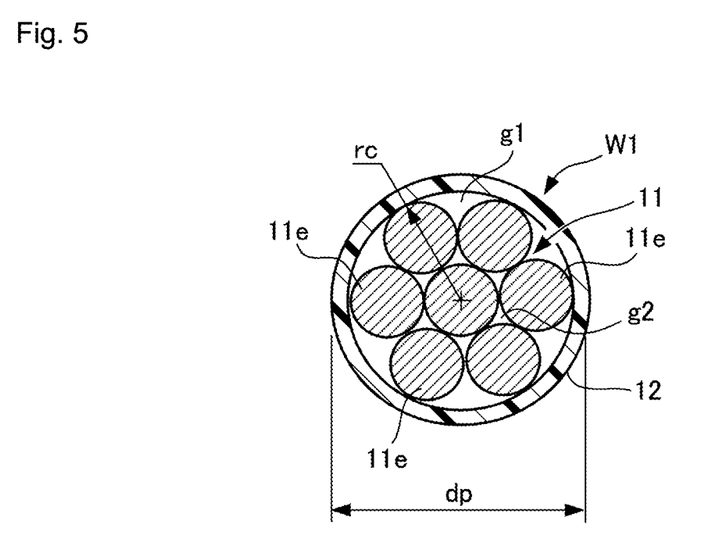
FIG. 5 is a horizontal cross-sectional view of an insulation-coated wire in a portion of the wire harness including the water blocking structure for an insulation-coated wire according to the first embodiment of the present invention.

As shown in FIGS. 1 and 5, for example, the insulation-coated wire W1 is constituted by a conductor 11 consisting of a plurality of elemental wires 11e that are bundled together and a coating 12 that concentrically surrounds the conductor 11.

The conductor 11 is configured by, for example, a circular stranded wire obtained by twisting together the plurality of elemental wires 11e, which are soft conducting wires, but is not necessarily required to be a stranded wire. The coating 12 is configured by, for example, a tube of an insulating material having a circular cross section, the tube being made of resin containing vinyl chloride resin as a main component.

An intermediate portion W1a (portion away from both end portions) of the insulation-coated wire W1 in a longitudinal direction is bent in a folded-backward direction as shown in FIG. 1 and thus has a substantially U shape. Moreover, a linear slit portion 13 is formed in the coating 12 within a region where this intermediate portion W1a is bent in the folded-backward direction. The slit portion 13 is formed by linearly cutting and opening the coating 12 within that bent region with a cutting instrument and is adapted to expose a portion of the conductor 11 to the outside of the coating 12.

As shown in FIG. 1, for example, the slit portion 13 extends in a circumferential direction (outer circumferential direction in a horizontal cross section) of the coating 12 of the insulation-coated wire W1 on the outside of the bend of the intermediate portion W1a of the insulation-coated wire W1, and has an opening shape that is widest at the center in the extending direction.

Although the slit portion 13 here is a single slit portion that is made on the outside of the bend of the intermediate portion W1a of the insulation-coated wire W1, it is also possible to adopt, for example, a pair of left and right slit portions that are made near respective corner positions of the slit portion 13 in FIG. 1 so as to extend parallel to each other or at a predetermined crossing angle in tangential directions. Moreover, the cutting direction may be slanted with respect to the direction shown in the drawing that is perpendicular to the axis of the insulation-coated wire W1. That is to say, any number of slit portions 13 may be disposed in any position and orientation.

In the intermediate portion W1a of the insulation-coated wire W1, the plurality of elemental wires 11e of the conductor 11 are individually bent in a folded-backward direction and form a substantially U shape. Moreover, the intermediate portion W1a of the insulation-coated wire W1 is accommodated within a heat-shrinkable protective member 21 (tubular member) that has a substantially bottomed cylindrical shape and is closed at one end. This protective member 21 is used to provide insulation, heat resistance, and mechanical protection.

A resin material 25 functioning as a water blocking agent is provided inside the protective member 21, and the resin material 25 is cured in a substantially bottomed cylindrical shape in a state in which the slit portion 13 and the intermediate end portions 12a and 12b of the coating 12 that are adjacent to the slit portion 13 are coated with the resin material 25.

This resin material 25 penetrates the inside of the coating 12 of the intermediate portion W1a via the slit portion 13 while being accommodated inside the protective member 21 so as to surround the intermediate portion W1a of the insulation-coated wire W1. Moreover, the resin material 25 has an outer diameter that is larger than the sum of the diameters of a pair of parallel portions of the coating 12 that are continuous with the folded-back intermediate portion W1a of the insulation-coated wire W1, and also has an axial length that is larger than the formation range of the slit portion 13 in the axial direction of the protective member 21.

Both of the outer diameter and the axial length of the protective member 21 are larger than those of the resin material 25. This protective member 21 has a stopper 22 (closing member) that closes one end of the protective member 21 while being spaced apart from the slit portion 13 by a predetermined separation distance in the axial direction, and a heat-shrinkable tube 23 that is shrunken to a predetermined shrunken diameter and whose inner circumference on the side of one end portion 23a is in close contact with the stopper 22.

The stopper 22 has a circular horizontal cross section, for example; however, stoppers having an elliptical or other non-circular horizontal cross sections may also be used. Moreover, an annular rib, a flange, an annular groove, or the like may be formed at an outer circumferential portion of the stopper 22, and the stopper 22 may have a truncated cone-shaped vertical cross section.

The heat-shrinkable tube 23 surrounds the pair of intermediate end portions 12a and 12b of the coating 12 that are in close proximity to the slit portion 13 on opposite sides thereof as well as the slit portion 13. This heat-shrinkable tube 23 is made of a tube that shrinks in a radial direction when heated, and is obtained by cutting out a tube from a longer tube and shrinking the tube to a predetermined shrunken diameter. This heat-shrinkable tube 23 is made of a known tube whose shrunken inner diameter after heat shrinkage is generally about ½ of the inner diameter before heat shrinkage.

The stopper 22 has an outer diameter that is larger than a shrunken diameter of the heat-shrinkable tube 23 at the limit of shrinkage and is in close contact with the inner circumference of the end portion 23a of the heat-shrinkable tube 23 in a pressure contact state. It should be noted that the shrunken diameter of the heat-shrinkable tube 23 as used herein refers to a dimension of an inner circumferential surface of the end portion 23a of the heat-shrinkable tube 23 that is geometrically similar to an outer circumferential surface of the stopper 22, with respect to a corresponding radial direction.

The stopper 22 is composed of, for example, a hard resin or a lightweight metal. In the case where the stopper 22 is formed of a resin, a polyolefin resin such as, for example, polypropylene (PP) or polyethylene (PE) can be used. Moreover, forming the heat-shrinkable tube 23 of a polyolefin resin, such as, for example, polypropylene (PP) or polyethylene (PE), can cause the heat-shrinkable tube 23 to develop a heat sealing property on the outer circumferential surface of the stopper 22 when shrinking and coming into close contact with the outer circumference of the stopper 22 in a liquid-tight manner.

The resin material 25 is formed of a thermoset layer of a thermosetting resin, for example, a two-component thermosetting epoxy resin having low viscosity, which is cured while being brought into close contact with the protective member 21 and the insulation-coated wire W1. The low viscosity means such a degree of viscosity that the two-component thermosetting epoxy resin having fluidity before thermal curing exhibits a high degree of adhesion to the circumference of the conductor 11 exposed in the slit portion 13 and also easily penetrates gaps g1 and g2 (see FIG. 5) among the elemental wires 11e in the vicinity of the slit portion 13.

Thus, the resin material 25 is cured while forming one end surface 25a that is in close contact with the stopper 22 between the protective member 21 and the insulation-coated wire W1 and penetrating the inside of the coating 12 from the slit portion 13 and also the gap g2 that is formed among the elemental wires 11e inside the slit portion 13.

On the other hand, within the protective member 21, the coating stripping member 40 having a sharp cutting blade portion 31 (blade portion) that is capable of cutting open the coating 12 is contained in a state in which a cutting edge of the cutting blade portion 31 is cutting into the coating 12 (within diameter dp). Furthermore, within the protective member 21, a holding member 33 with a retaining blade portion 32 that is joined to the stopper 22 and holds the intermediate portion W1a of the insulation-coated wire W1 together with the stopper 22 is contained. Thus, the coating stripping member 40 is constituted by at least one of the stopper 22 and the holding member 33 and, for example, may be constituted by both the the stopper 22 and the holding member 33.

The coating stripping member 40 is adapted to form the slit portion 13 in the coating 12 of the insulation-coated wire W1 and thus be able to provide the function of exposing a portion of the conductor 11 inside the coating 12 to the outside of the coating 12 without stripping the coating 12 from the conductor 11, that is to say, the function equivalent to stripping the coating.

Figure 2A:
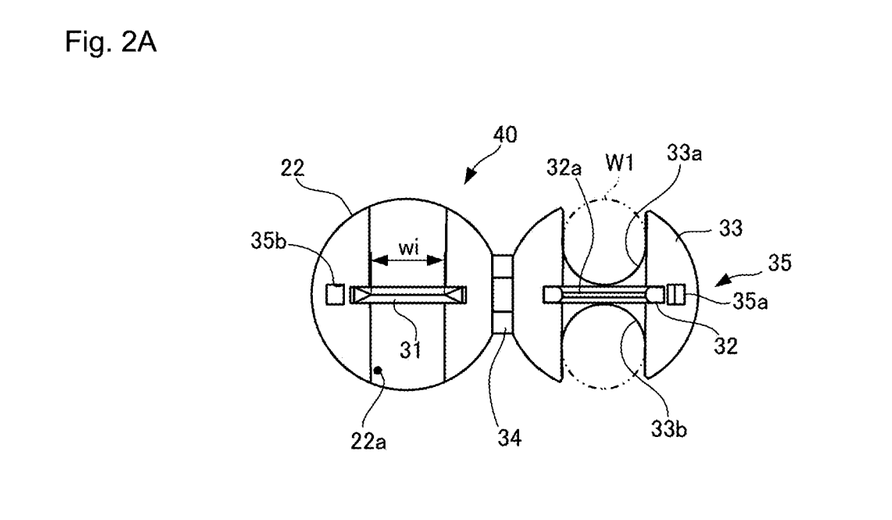
FIG. 2A is a plan view of the coating stripping member when opened and FIG. 2B is a side view of the coating stripping member when opened.
Figure 2B:
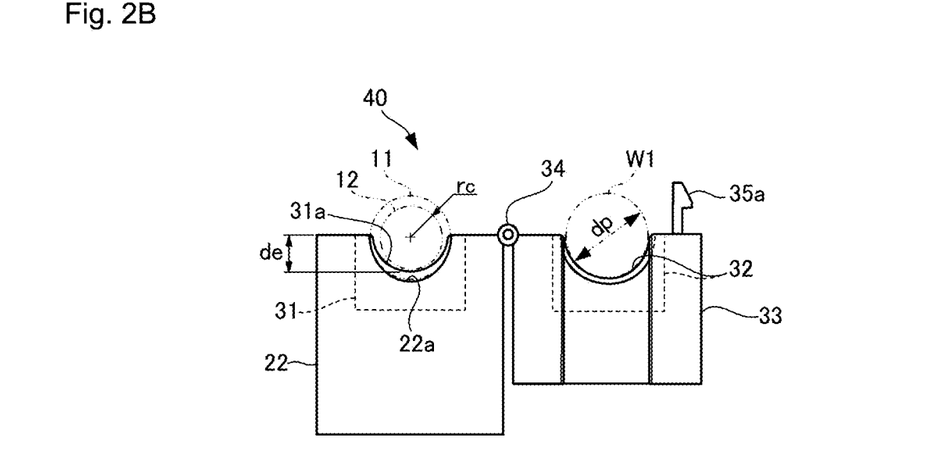

The cutting blade portion 31 has a substantially semi-cylindrical cutting edge line 31a having an entrance width wi that is close to the diameter dp of the coating 12 of the insulation-coated wire W1 and a depth de that is close to the radius rc of the conductor 11 (e.g., rc≤de<dp/2), and the cutting edge angle (this means the angle formed by the two blade surfaces) is an acute angle. This cutting blade portion 31 is not limited to the cutting edge line 31a having a substantially arc shape, and may also have a pair of cutting edge lines extending substantially parallel to each other in the direction of a tangent to a cross section of the conductor 11, a V-shaped cutting edge line, and the like.

A receiving groove 22a with a substantially arc-shaped cross section having a radius that is close to the radius of the coating 12 of the insulation-coated wire W1 is formed in an inner end portion of the stopper 22 that opposes the holding member 33, the receiving groove extending in the radial direction of the stopper 22. Also, the cutting blade portion 31 protrudes to the inside of the receiving groove 22a so as to have a first protruding length approximately equal to the thickness of the coating 12 on the inner side of the receiving groove 22a and a second protruding height that is smaller than the first protruding height on the entrance side of the receiving groove 22a. It should be noted that although the receiving groove 22a here extends to the outer circumferential surface of the stopper 22, it is also possible that the receiving groove 22a has a reduced depth in the vicinity of the outer circumferential surface of the stopper 22 such that the receiving groove 22a is blocked at both ends.

This cutting blade portion 31 is made of a material having a sufficiently greater thermal conductivity than both the resin material 25 and the coating 12, for example, a metal whose thermal conductivity is ten or more times greater than those of both the resin material 25 and the coating 12.

The retaining blade portion 32 has a substantially semi-circular cutting edge line or retaining surface 32a having an entrance width wi that is close to the diameter dp of the coating 12 of the insulation-coated wire W1 and a depth de that is substantially equal to the radius of the coating 12, and the cutting edge angle is an obtuse angle, or the cutting edge is flattened to an arc-shaped or polygonal cross section. The retaining surface 32a of this retaining blade portion 32 may also have a polygonal shape instead of a substantially arc shape.

The holding member 33 is fixed to the retaining blade portion 32 and has guide grooves 33a and 33b in the vicinity of the retaining blade portion 32, the guide grooves guiding the intermediate portion W1a of the insulation-coated wire W1 such that the intermediate portion W1a is bent in a folded-backward direction in a substantially U-shaped bent shape. Both of the guide grooves 33a and 33b have a substantially arc-shaped cross section having a radius that is close to the radius (dp/2) of the coating 12 of the insulation-coated wire W1, and are configured such that when the intermediate portion W1a of the insulation-coated wire W1 is guided in the folded-backward direction so as to have the bent shape, the retaining blade portion 32 abuts against the coating 12 on the inside of the bend of the intermediate portion W1a of the insulation-coated wire W1.

Figure 3:
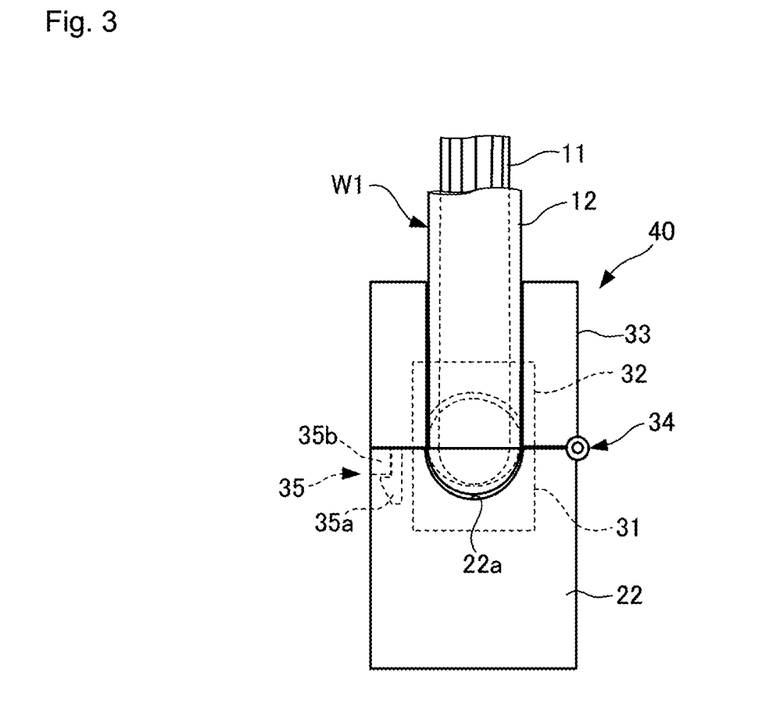
FIG. 3 is a side view showing the coating stripping member of the water blocking structure for an insulation-coated wire according to the first embodiment of the present invention in a state in which the coating stripping member is locked with the closing member and the holding member being engaged with each other.

Moreover, the holding member 33 is joined to the stopper 22 via a known hinge 34 and a lock mechanism 35, and in a state in which the lock mechanism 35 is released, the holding member 33 can be rotated relative to the stopper 22 between a fully opened position shown in FIGS. 2A and 2B and a lock position shown in FIG. 3.

The lock mechanism 35 may be of, for example, a snap-lock type having a hook-shaped locking claw 35a on the side of the holding member 33 and a locking portion 35b on the side of the stopper 22. However, any lock mechanism that is capable of locking the holding member 33 in the lock position shown in FIG. 3 relative to the stopper 22 can be adopted.

The holding member 33 is formed of a material such as, for example, hard resin or metal that is the same as or has substantially the same coefficient of linear expansion as the material for the stopper 22. In the case where the holding member 33 is formed of a hard resin, a polyolefin resin such as, for example, polypropylene (PP) or polyethylene (PE) can be used as in the case of the stopper 22, and it can be expected that a heat sealing property is exhibited when the heat-shrinkable tube 23 shrinks and comes into close contact with the outer circumference of the holding member 33 in a liquid-tight manner.

Next, an example of a method for manufacturing the wire harness 1 of the present embodiment will be described.

Figure 4:
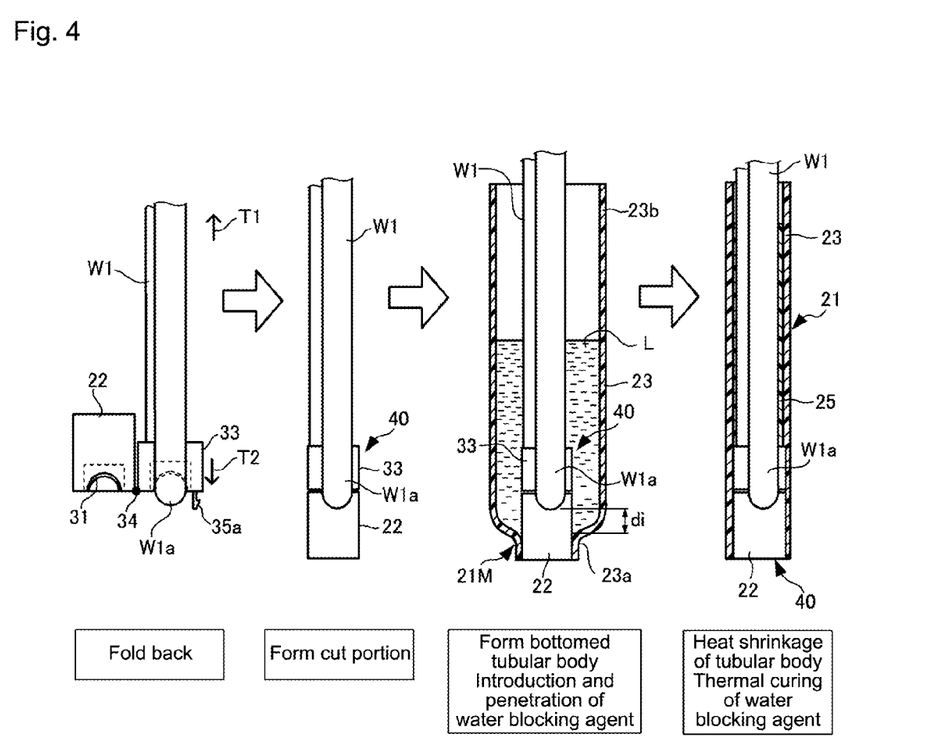
FIG. 4 is an explanatory diagram of a manufacturing process of the wire harness including the water blocking structure for an insulation-coated wire according to the first embodiment of the present invention.

First, as shown in a folding back step in FIG. 4, the insulation-coated wire W1 is bent in the folded-backward direction while bringing the holding member 33 into engagement with the intermediate portion W1a of the insulation-coated wire W1, and operating forces T1 and T2 in opposite directions are applied to the insulation-coated wire W1 and the holding member 33, respectively, so that the intermediate portion W1a of the insulation-coated wire W1 that is bent in a substantially U shape abuts against the retaining blade portion 32 and the guide grooves 33a and 33b of the holding member 33.

Then, as shown in a cut portion forming step in FIG. 4, the hinged stopper 22 is rotated in a direction in which the stopper 22 is brought close to the holding member 33, the stopper 22 and the holding member 33 are locked in the closed state shown in FIG. 3 by the lock mechanism 35, and the coating stripping member 40 is caused to function.

That is to say, the slit portion 13 that exposes a portion of the conductor 11 inside the coating 12 to the outside of the coating 12 is formed by the cutting blade portion 31 of the coating stripping member 40 without stripping the coating 12 in the bent region of the insulation-coated wire W1 from the conductor 11.

During formation of this slit portion 13, in a state in which a tensile stress is produced in the coating 12 of the bent insulation-coated wire W1 such that the tensile stress increases toward the outside of the bend, the stopper 22 and the holding member 33 are closed, and simultaneously, the cutting blade portion 31 cuts into the coating 12, so that the slit portion 13 that opens wide at its central portion with respect to the slit's longitudinal direction is formed on the outside of the bend of the intermediate portion W1a of the insulation-coated wire W1. Thus, a state in which the cutting blade portion 31 is located at a depth position where the cutting blade portion 31 is cutting into the coating 12, and also a portion of the conductor 11 is exposed to the outside of the coating 12 is achieved.

Then, as shown in a bottomed tubular body forming step in FIG. 4, the intermediate portion W1a of the insulation-coated wire W1 that is bent in the folded-backward direction and the coating stripping member 40 are inserted into the heat-shrinkable tube 23 before heat shrinkage so that the circumference of the stopper 22 constituting a portion of the coating stripping member 40 is surrounded by the end portion 23a of the heat-shrinkable tube 23.

Then, the end portion 23a of the heat-shrinkable tube 23 is heated by hot air or the like to bring the inner circumference of the end portion 23a of the heat-shrinkable tube 23 into close contact with the outer circumference of the stopper 22. The height of the cylindrical surface where the end portion 23a of the heat-shrinkable tube 23 and the stopper 22 are in close contact with each other is regulated such that a bottom surface (inner bottom surface) of the bottomed tubular body 21M on the inner side is separated from the leading end of the intermediate portion W1a of the insulation-coated wire W1 by a predetermined separation distance di in the axial direction. It should be noted that in the case where the stopper 22 and the holding member 33 are locked in an abutted state instead of being hinged to each other, it is also possible that a bottomed tubular body for the protective member 21 is produced in advance by heating the end portion 23a of the heat-shrinkable tube 23 with hot air or the like and thereby bringing the end portion 23a into close contact with the outer circumference of the stopper 22.

Then, as shown in a water blocking agent introduction and penetration step in FIG. 4, the heat-shrinkable tube 23 (hereinafter also referred to as the bottomed tubular body 21M) whose end portion 23a is closed by the stopper 22 is oriented in the vertical direction with the closed end being located on the lower side, and a predetermined amount of two-component thermosetting epoxy resin solution L (water blocking agent), which is the material for the resin material 25, is introduced into the bottomed tubular body 21M from the vertically upper side of the heat-shrinkable tube 23 where the other end portion 23b is open. The amount of the solution to be introduced is set such that the intermediate portion W1a of the insulation-coated wire W1, especially within a certain distance from the slit portion 13, is immersed in the thermosetting epoxy resin solution L.

At this time, since the slit portion 13 is formed in the intermediate portion W1a of the insulation-coated wire W1, and a portion of the conductor 11 is exposed in the slit portion 13, the thermosetting epoxy resin solution L having low viscosity and high penetrability enters the inside of the coating 12 from the slit portion 13 of the insulation-coated wire W1 and even into, for example, gaps among the plurality of elemental wires 11e of the conductor 11, and reliably penetrates through a water blocking region within a predetermined distance from the slit portion 13 due to a combined effect of capillary phenomenon, negative pressure produced within the coating 12, and the like.

Then, as shown in a tubular body heat shrinkage and water blocking agent thermal curing step in FIG. 4, the bottomed tubular body 21M in a state in which the insulation-coated wire W1 is inserted to a predetermined insertion depth position and the slit portion 13 is immersed in the water blocking agent is entirely heated from the outside to shrink the heat-shrinkable tube 23 of the bottomed tubular body 21M and thermally cure the thermosetting epoxy resin solution L in that heat-shrinkable tube 23.

At this time, first, the heat-shrinkable tube 23 of the bottomed tubular body 21M undergoes heat shrinkage so that the diameter thereof is significantly reduced overall, and thus the heat-shrinkable tube 23 is formed, and the surface level of the thermosetting epoxy resin solution L increases. Then, when the heat-shrinkable tube 23 entirely shrinks to such an extent that the diameter thereof approaches a predetermined shrunken diameter, the thermosetting epoxy resin solution L has started to thermally cure, and finally, when the heat-shrinkable tube 23 entirely shrinks to almost the predetermined shrunken diameter that is close to the limit of shrinkage, the resin material 25 composed of a cured layer of the thermosetting epoxy resin is formed.

Next, the effects of the present embodiment will be described.

In the present embodiment that is configured as described above, the slit portion 13 from which the water blocking agent is allowed to penetrate to the inside of the coating 12 is formed within the bent region where the intermediate portion W1a of the insulation-coated wire W1 is bent in the folded-backward direction. Accordingly, the necessity to perform the coating stripping operation (intermediate sheath stripping operation) for exposing the conductor within a specific longitudinal region of the intermediate portion W1a of the insulation-coated wire W1 in the longitudinal direction in advance is eliminated.

Specifically, in a state in which a stress is produced in the intermediate portion W1a of the insulation-coated wire W1 that is bent in the folded-backward direction, when a slit having a predetermined depth is made in the coating 12 within the bent region by the cutting blade portion 31, which is a cutting instrument, the opening of the slit is widened due to the effect of the stress, and thus the slit portion 13 that exposes a portion of the conductor 11 to the outside of the coating 12 is reliably formed.

Accordingly, before heat shrinkage of the heat-shrinkable tube 23 of the protective member 21, the two-component thermosetting epoxy resin solution L, which is the water blocking agent, penetrates the inside of the coating 12 of insulation-coated wire W1 and even, for example, gaps among the elemental wires of the conductor 11 via the slit portion 13. Moreover, when the heat shrinkage of the heat-shrinkable tube 23 of the protective member 21 and the thermal curing of the two-component thermosetting epoxy resin solution L start from the outer side, the inner pressure of the thermosetting epoxy resin solution L inside the bottomed tubular body 21M tends to increase. Accordingly, the two-component thermosetting epoxy resin solution L, which is the water blocking agent, reliably penetrates the inside of the coating 12 of the insulation-coated wire W1 and even, for example, gaps among the elemental wires of the conductor 11 via the slit portion 13.

When the heat-shrinkable tube 23 has been thermally shrunken to the predetermined shrunken diameter, and also the thermal curing of the thermosetting epoxy resin solution L has been finished, the water blocking structure for the insulation-coated wire is completed.

According to the present embodiment that is thus obtained, the wire harness 1 having a low-cost water blocking structure for an insulation-coated wire that can ensure high water blocking ability and favorable workability can be provided without the intermediate sheath stripping operation. Moreover, according to the present embodiment, the cutting blade portion 31 also prevents the slit portion 13 in the cut open state from being closed. As a result, the heat-shrinkable tube 23 is thermally shrunken in a state in which the water blocking agent has reliably penetrated the coating 12 from the slit portion 13 of the insulation-coated wire W1 and even, for example, gaps among the elemental wires 11e of the conductor 11.

Furthermore, according to the present embodiment, since the cutting blade portion 31 has a sufficiently greater thermal conductivity than both the water blocking agent and the coating 12, during application of heat for thermally shrinking the heat-shrinkable tube 23, the cutting blade portion 31 can cut into the coating 12 with a sufficiently increased efficiency.

In addition, according to the present embodiment, an inner diameter of the heat-shrinkable tube 23 that is suitable for the operation of inserting the wire into the heat-shrinkable tube 23 of the protective member 21 can be set easily, and before thermal curing of the thermosetting epoxy resin solution L, which is the water blocking agent, the water blocking agent can be easily introduced into the heat-shrinkable tube 23 of the protective member 21 together with a portion of the insulation-coated wire W1. Moreover, the low-viscosity, two-component thermosetting epoxy resin solution L that exhibits a high degree of adhesion to the conductor 11 and also easily penetrates the gaps g1 and g2 and the like in the coating 12 can be used. Accordingly, a stable cured layer that has high water blocking ability and high resistance to heat and that has reliably penetrated the circumference of the conductor 11, the gaps among the elemental wires, and the like within the coating 12 can be formed as the resin material 25.

As described above, according to the present embodiment, it is possible to provide a low-cost water blocking structure for an insulation-coated wire that can ensure high water blocking ability and favorable workability at the intermediate portion W1a of the insulation-coated wire W1, and it is possible to provide the low-cost wire harness 1 that employs the above water blocking structure and has high water blocking ability and favorable workability.

Second Embodiment

Figure 6:
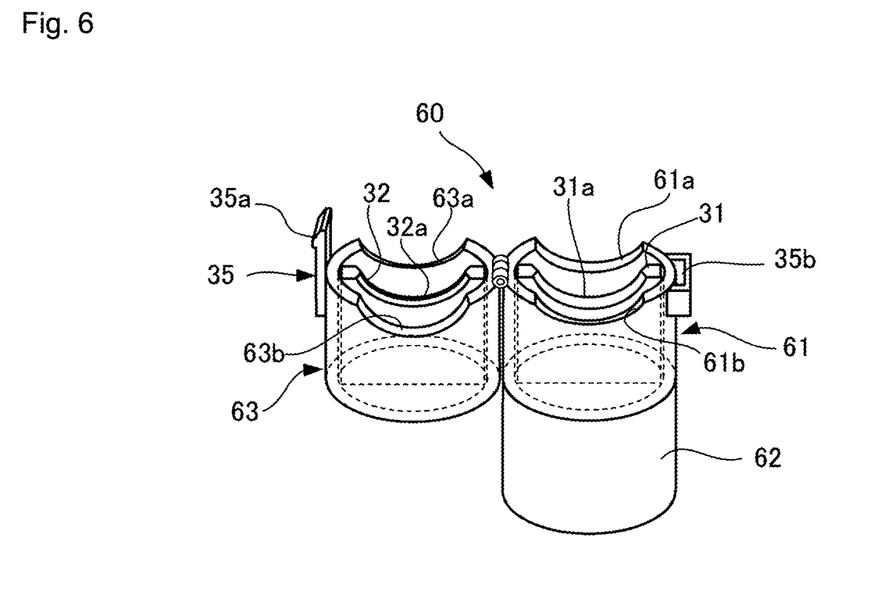
FIG. 6 is a perspective view showing a coating stripping member of a water blocking structure for an insulation-coated wire according to a second embodiment of the present invention in a state in which the coating stripping member is opened to the side of a closing member and the side of a holding member.

FIG. 6 shows a coating stripping member according to a second embodiment of the water blocking structure for an insulation-coated wire according to the present invention. It should be noted that embodiments that are described below have overall configurations similar to that of the first embodiment described above, even though the configurations of the coating stripping members are different from that of the first embodiment described above. Therefore, components that are the same as or similar to those of the first embodiment are denoted by the reference numerals of the corresponding components of the first embodiment shown in FIGS. 1 to 5, and the following description focuses on the differences from the first embodiment.

In the second embodiment shown in FIG. 6, a coating stripping member 60 is provided inside the protective member 21. It should be noted that FIG. 6 shows a state in which the coating stripping member 60 is opened like the opened state (see FIG. 2B) of the coating stripping member 40 of the first embodiment, and the coating stripping member 60 is adapted so as to be locked in a closed state similarly to the coating stripping member 40 of the first embodiment shown in FIG. 3.

The coating stripping member 60 includes a first tubular holding portion 61 that holds the sharp cutting blade portion 31 that is capable of cutting open the coating 12 of the insulation-coated wire W1, a stopper 62 that closes the end portion 23a of the heat-shrinkable tube 23, and a second tubular holding portion 63 with the retaining blade portion 32 that holds the intermediate portion W1a of the insulation-coated wire W1 together with the first tubular holding portion 61. Also, the coating stripping member 60 has the known hinge 34 and the lock mechanism 35 that join the first tubular holding portion 61 and the second tubular holding portion 63 to each other.

The first tubular holding portion 61 is a substantially cylindrical body that is made of resin or metal and to which the cutting blade portion 31 is integrally fixed, and is fixed to the stopper 62 on one end side in the axial direction. Moreover, on the other end side of the first tubular holding portion 61 in the axial direction, a pair of substantially semi-circular recesses 61a and 61b that are recessed in the same direction as the cutting edge line 31a of the cutting blade portion 31 are formed so as to guide and hold the intermediate portion W1a of the insulation-coated wire W1.

The second tubular holding portion 63 is a substantially cylindrical body that is made of resin or metal and to which the retaining blade portion 32 is integrally fixed, and is hinged to the first tubular holding portion 61 on one end side in the axial direction. Moreover, on that end side of this second tubular holding portion 63 in the axial direction, a pair of substantially semi-circular recesses 63a and 63b that are recessed in the same direction as the cutting edge line or retaining surface 32a of the retaining blade portion 32 are formed so as to guide and hold the intermediate portion W1a of the insulation-coated wire W1.

In the present embodiment, unlike the first embodiment, no guide groove extending in the axial direction so as to guide the intermediate portion W1a of the insulation-coated wire W1 that is bent in the folded-backward direction is formed in the second tubular holding portion 63, but the position of the leading end of the intermediate portion W1a of the insulation-coated wire W1 is determined by the retaining blade portion 32. Then, the cutting blade portion 31 that is held so as to oppose the retaining blade portion 32 via the first tubular holding portion 61 and the second tubular holding portion 63 cuts into the coating 12 within the bent region, and thus the slit portion 13 is formed.

The present embodiment also makes it possible to provide a low-cost water blocking structure for an insulation-coated wire that can ensure high water blocking ability and favorable workability at an intermediate portion, and to provide a low-cost wire harness that employs this water blocking structure and has high water blocking ability and favorable workability.

Furthermore, according to the present embodiment, since both of the first tubular holding portion 61 and the second tubular holding portion 63 of the coating stripping member 60 have a tubular shape, and the thermosetting epoxy resin solution L is easily introduced around the slit portion 13 without resistance, the water blocking ability can be increased even more.

Third Embodiment

Figure 7:
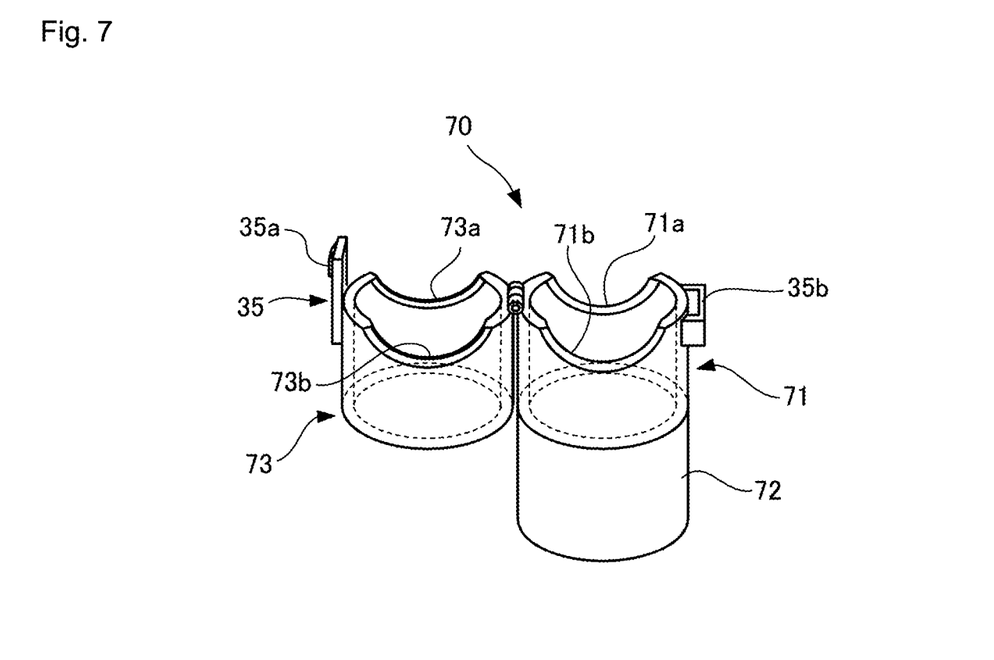
FIG. 7 is a perspective view showing a coating stripping member of a water blocking structure for an insulation-coated wire according to a third embodiment of the present invention in a state in which the coating stripping member is opened to the side of a closing member and the side of a holding member.

FIG. 7 shows a coating stripping member according to a third embodiment of the water blocking structure for an insulation-coated wire according to the present invention.

In the third embodiment shown in FIG. 7, a coating stripping member 70 is provided inside the protective member 21. It should be noted that FIG. 7 shows a state in which the coating stripping member 70 is opened like the opened state (see FIG. 2B) of the coating stripping member 40 of the first embodiment, and the coating stripping member 70 is adapted to be locked in a closed state similarly to the coating stripping member 40 of the first embodiment shown in FIG. 3.

The coating stripping member 70 includes a first tubular holding portion 71 in which recessed, sharp cutting blade portions 71a and 71b that are capable of cutting open the coating 12 of the insulation-coated wire W1 are formed, a stopper 72 that closes the end portion 23a of the heat-shrinkable tube 23, and a second tubular holding portion 73 in which retaining blade portions 73a and 73b that hold the intermediate portion W1a of the insulation-coated wire W1 together with the first tubular holding portion 71 are formed at intervals of 180 degrees. Also, the coating stripping member 70 has the known hinge 34 and the lock mechanism 35 that join the first tubular holding portion 71 and the second tubular holding portion 73 to each other.

The first tubular holding portion 71 is a substantially cylindrical body made of metal and is fixed to the stopper 72 on one end side in the axial direction, and on the other end side thereof in the axial direction, the substantially arc-shaped cutting blade portions 71a and 71b are formed at intervals of 180 degrees.

The second tubular holding portion 73 is a substantially cylindrical body made of metal and is hinged to the first tubular holding portion 71 on one end side in the axial direction, and on that end side in the axial direction, the retaining blade portions 73a and 73b are formed at intervals of 180 degrees.

In the present embodiment, the operating forces T1 and T2 are applied to the intermediate portion W1a of the insulation-coated wire W1 in a state in which the intermediate portion W1a engages with the pair of retaining blade portions 73a and 73b on the inside of a central portion of a substantially U-shaped folded back portion (see the folding back step in FIG. 4), and thus the shape of the bend and the position of the leading end are determined.

Then, the cutting blade portions 71a and 71b that are held so as to oppose the respective retaining blade portions 73a and 73b cut into the coating 12 within the bent region, and thus the slit portions 13 are formed at a plurality of positions in the intermediate portion W1a of the insulation-coated wire W1.

The present embodiment also makes it possible to provide a low-cost water blocking structure for an insulation-coated wire that can ensure high water blocking ability and favorable workability at an intermediate portion, and to provide a low-cost wire harness that employs this water blocking structure and has high water blocking ability and favorable workability.

Furthermore, according to the present embodiment, since both of the first tubular holding portion 71 and the second tubular holding portion 73 of the coating stripping member 70 have a tubular shape, the thermosetting epoxy resin solution L is easily introduced around the slit portions 13 without resistance, and since the slit portions 13 are formed at a plurality of positions, the water blocking ability can be increased even more.

It should be noted that in the foregoing embodiments, a configuration is adopted in which the cutting blade portion 31 and the retaining blade portion 32 are arranged inside the heat-shrinkable tube 23 of the protective member 21; however, it is also possible that depending on the shape of the bend of the intermediate portion W1a of the insulation-coated wire W1, both the cutting blade portion 31 and the retaining blade portion 32 are constituted by sharp cutting instruments, and a separate retaining portion is provided in the holding member. Moreover, although the slit portion 13 is formed at one position or at two positions of the intermediate portion W1a of the insulation-coated wire W1 in the axial direction, it goes without saying that multiple slit portions may also be formed at three or more positions.

Furthermore, in the foregoing embodiments, a configuration is adopted in which the cutting blade portion 31 and the retaining blade portion 32 are arranged inside the protective member 21; however, it is also possible that, for example, instead of the cutting blade portion 31 of the first embodiment, a cutting blade portion constituted by a straight blade is attached to the stopper 22 so as to be removable in the radial direction, and after the slit portion 13 is formed, the cutting blade portion is removed from the stopper 22 so as not to remain within the protective member 21. Moreover, the retaining blade portion 32 of the first embodiment may also be formed of a hard resin instead of being a metal blade.

Moreover, although each of the cutting blade portion 31 and the retaining blade portion 32 forms a single substantially arc-shaped recessed cutting edge in the foregoing description, the cutting blade portion 31 and the retaining blade portion 32 may each be a substantially saw-shaped portion in which a plurality of substantially arc-shaped recessed cutting edges are formed at regular intervals. Also, a configuration is conceivable in which the cutting blade portion 31 and the retaining blade portion 32 are supported by an angular tube-shaped or elliptical tube-shaped closing member and holding member (or a first and second holding member), and slit portions 13 are formed in respective intermediate portions of a plurality of insulation-coated wires. Moreover, a configuration is conceivable in which another insulation-coated wire whose intermediate portion is bent in a substantially U shape like the insulation-coated wire W1 is inserted into the protective member 21 to an insertion depth different from that of the insulation-coated wire W1.

As described above, the present invention can provide a low-cost water blocking structure for an insulation-coated wire that can ensure high water blocking ability and favorable workability at an intermediate portion of the insulation-coated wire as well as a wire harness including the water blocking structure, and is useful for a water blocking structure for an insulation-coated wire that is effective when provided at an intermediate portion of the insulation-coated wire as well as wire harnesses in general.

What is claimed is:

1. A water blocking structure for an insulation-coated wire, the water blocking structure comprising:
   a heat-shrinkable tubular member that is closed at one end and that accommodates an intermediate portion of an insulation-coated wire that is bent in a folded-backward direction, and a water blocking agent that is accommodated in the tubular member and that penetrates the intermediate portion of the insulation-coated wire,
   wherein a slit portion is formed in a coating of the insulation-coated wire within a region where the intermediate portion is bent in the folded-backward direction, and the water blocking agent penetrates the intermediate portion via the slit portion; and
   a closing member that closes one end of the tubular member and a holding member that is joined to the closing member and holds the intermediate portion of the insulation-coated wire together with the closing member,
   wherein the holding member is positioned outside of the closing member.

2. The water blocking structure for an insulation-coated wire according to claim 1, further comprising:
   a coating stripping member having a blade portion that is configured to cut open the coating of the insulation-coated wire, and which is contained inside the tubular member in a condition in which the blade portion is cutting into the coating.

3. The water blocking structure for an insulation-coated wire according to claim 2,
   wherein the blade portion has a greater thermal conductivity than both the water blocking agent and the coating.

4. The water blocking structure for an insulation-coated wire according to claim 3,
   wherein the coating stripping member includes at least one of the closing member and the holding member, and
   the water blocking agent is formed of a cured layer of a two-component thermosetting epoxy resin.

5. A wire harness comprising the water blocking structure for an insulation-coated wire according to claim 4.

6. A wire harness comprising the water blocking structure for an insulation-coated wire according to claim 3.

7. The water blocking structure for an insulation-coated wire according to claim 2, wherein the coating stripping member includes at least one of the closing member and the holding member, and
the water blocking agent is formed of a cured layer of a two-component thermosetting epoxy resin.

8. A wire harness comprising the water blocking structure for an insulation-coated wire according to claim 7.

9. A wire harness comprising the water blocking structure for an insulation-coated wire according to claim 2.

10. A wire harness comprising the water blocking structure for an insulation-coated wire according to claim 1.

* * * * *